United States Patent [19]

Van Gerpen

[11] E Re. 29,672

[45] Reissued Jun. 20, 1978

[54] DEMAND COMPENSATED HYDRAULIC SYSTEM WITH PRESSURE AMPLIFIER

[75] Inventor: Harlan Welbert Van Gerpen, Cedar Falls, Iowa

[73] Assignee: Deere & Company, Moline, Ill.

[21] Appl. No.: 809,563

[22] Filed: Jun. 24, 1977

Related U.S. Patent Documents

Reissue of:

[64] Patent No.: 3,990,237
Issued: Nov. 9, 1976
Appl. No.: 644,882
Filed: Dec. 29, 1975

[51] Int. Cl.[2] ..... F16H 39/46; F15B 11/16

[52] U.S. Cl. ..... 60/445; 60/451; 60/484; 417/212

[58] Field of Search ..... 60/420, 422, 427, 445, 60/451, 484; 417/212

[56] References Cited

U.S. PATENT DOCUMENTS

| | | | |
|---|---|---|---|
| 2,892,311 | 6/1959 | Van Gerpen | 60/422 |
| 2,892,312 | 6/1959 | Allen et al. | 60/427 |
| 3,754,400 | 8/1973 | Parquet | 60/445 |
| 3,826,090 | 7/1974 | Bahl | 60/445 |

*Primary Examiner*—Edgar W. Geoghegan

[57] ABSTRACT

A hydraulic system having fluid flow feedback from a fluid motor to a demand control valve which operates to change pump output to compensate for motor demand includes a pressure amplifier between the feedback system and the valve. The pressure amplifier includes a chamber with a piston therein which is slidable to connect or block pump output fluid flow to the valve in response to feedback pressure variations from the motor.

4 Claims, 1 Drawing Figure

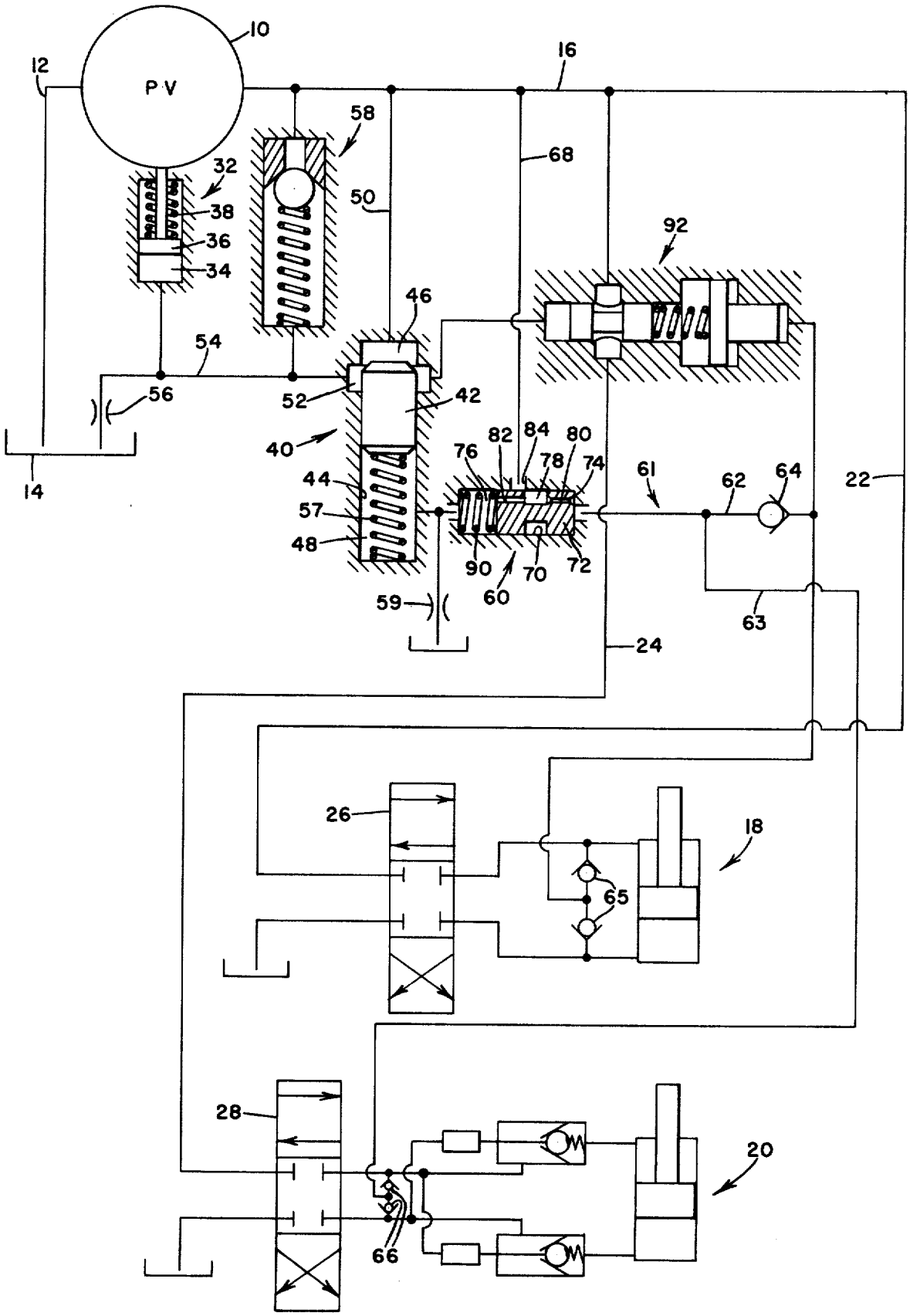
10
12
PV
16
58
68
32
38
36
34
50
92
46
54
56
52
42
40
14
82
84
80
76
78
74
61
62
64
22
44
57
48
90
70
72
60
59
63
24
26
18
65
28
20
66

DEMAND COMPENSATED HYDRAULIC SYSTEM WITH PRESSURE AMPLIFIER

Matter enclosed in heavy brackets [ ] appears in the original patent but forms no part of this reissue specification; matter printed in italics indicates the additions made by reissue.

BACKGROUND OF THE INVENTION

The invention relates generally to hydraulic systems and more particularly to an improved hydraulic system embodying a demand compensated principle in which the fluid output of a variable displacement pump can be made proportional to the instantaneous pressure demand of one or more fluid motors supplied by the pump.

In the past, the instantaneous demand was sensed by flow changes at the motors and the flow variations were fed back as hydraulic fluid flow to the demand control valve by small pilot lines as in the U.S. Pat. No. 2,892,311 granted to H. W. Van Gerpen on June 30, 1959 and the U.S. Pat. No. 2,892,312 granted to J. R. Allen et al. on June 30, 1959. With the small pilot lines, temperature changes during cold weather would increase the fluid viscosity and thus decrease the flow rate causing substantial problems by decreasing or eliminating the demand compensation response of the system.

SUMMARY OF THE INVENTION

The present invention provides an improved demand compensated hydraulic system which includes a pressure amplifier which makes the pump output responsive substantially to pressure feedback rather than flow feedback, thus minimizing fluid viscosity related problems.

The above and additional advantages of the present invention will become apparent to those skilled in the art from a consideration of the following detailed description of the preferred embodiment when taken in conjunction with the accompanying drawing.

BRIEF DESCRIPTION OF THE DRAWING

The drawing shows schematically and partially in section, the demand compensated system employed with a plurality of motors and incorporating the present invention.

DESCRIPTION OF THE PREFERRED EMBODIMENT

The demand compensated hydraulic system shown in the drawing is generally similar to the Van Gerpen patent for Hydraulic Apparatus and a more detailed description of the conventional components may be had by reference thereto. The numeral 10 represents a conventional variable displacement pump having an intake line 12 connected to a reservoir 14 and a high pressure output line 16. The output line 16 is connected to a hydraulic system which includes first and second two-way hydraulic motors 18 and 20 which are connected in parallel to the output line 16 respectively by first and second supply branches 22 and 24. First and second control valves 26 and 28, respectively, are interposed in the branches 22 and 24 for selectively causing pressurization of the motors 18 and 20 by the pump 10. Both control valves are shown in their neutral positions.

The output of the pump 10 is under the control of a conventional pump output control mechanism 32, here comprising a fluid receivable chamber 34 in which means such as a piston 36 moves in one direction under action of a biasing means in the form of a spring 38 to increase pump output and in the opposite direction to decrease pump output in response to pressurized fluid admitted to the chamber 34 through a conventional demand compensating or demand control valve indicated in its entirety at 40.

The demand control valve 40 comprises a piston 42 which separates a bore 44 into pressure and pilot chambers 46 and 48, respectively. The pressure chamber 46 is connected via a control line 50 to the output line 16, and by a port chamber 52 therein to the output control mechanism chamber 34 via a control line 54. The control line 54 further leads via an orifice 56 to the reservoir 14. A conventional relief valve 58 is connected across the lines 16 and 54 and dumps excessively pressurized fluid to line 54 for ultimate exhaust to the reservoir 14 and at the same time affording an instantaneous pressure rise in the chamber 34 for moving the pump out of stroke to decrease the pump output. The pilot chamber 48 of the demand valve means 40 contains a spring 57 biasing the piston 42 toward the pressure chamber 46. The pilot chamber 48 is connected to the reservoir 14 through a restricted reservoir line 59 and to a pressure amplifier means 60.

The pressure amplifier means 60 is further connected to a feedback or pilot line circuit 61 which in turn connects to first and second feedback or pilot line branches 62 and 63. The first feedback branch 62 contains a check valve 61 and is connected to the first supply branch 22 through a check valve assembly 65. The second feedback branch 63 is connected to the second supply branch 24 through a check valve assembly 66. The pressure amplifier means 60 is further connected to the output line 16 by a high pressure line 68.

The pressure amplifier means 60 includes a chamber 70 which is divided by a valving piston 72 into a pilot side chamber 74 connected to the pilot circuit 61 and a demand side chamber 76 connected to the demand valve 40. The valving piston 72 includes an annular groove 78 which is connected to the pilot side chamber 74 by a restricted orifice 80 and to the demand side chamber 76 by a fluid passageway 82. The valving piston 72 is slidable in the chamber 70 to afford or block fluid communication between a port 84, in the wall of the chamber 70 to which the high pressure line 68 is connected, and the annular groove 78. A spring 90 biases the valving piston 72 toward the pilot side chamber 74.

A conventional priority valve 92 is interposed in the second supply branch 24 and is connected to the first pilot branch 62 in parallel with the check valve 64 and thence to the port chamber 52 of the demand valve 40. The priority valve 92 opens the second supply branch 24 when the port chamber 52 pressure is at a predetermined high value and closes the second supply branch 24 when the chamber pressure decreases to a predetermined low value as fully described in the Van Gerpen patent.

In operation, assuming that both control valves 26 and 28 are in neutral, the pressure in the output line 16 and in the supply branches 22 and 24 ahead of the control valves 26 and 28 will be determined by the load applied by the spring 57 in the demand control valve 40. Consequently, the port chamber 52 will be open to fluidly connect the control lines 50 and 54 for supplying fluid to the output control mechanism 32. A small steady flow is supplied, the rate of which is dependent for one thing on the size of the orifice 56. Thus, the output of the pump is relatively low, being sufficient only to maintain the flow just described at a corresponding pressure which may be considered the "standby" pressure. At this time, there will be no flow or pressure in the pilot circuit 61, since the control valves 26 and 28 are in neutral and any fluid trapped in the pilot circuit 61 can bleed to the reservoir 14 through the restrictor 80 and the passage 82 in the valving piston 72 of the pressure amplifier means 60 and thence through the restricted line 59.

If either the control valve 26 or 28 is moved out of its neutral position so as to establish fluid communication to the motor 18 or 20, a pressure will be created in the first or second branches 62 or 63 of the pilot circuit 61. As the pressure increases in the pilot circuit 61, the pressure in the pilot side chamber 74 of the pressure amplifier means 60 will increase faster than it can be relieved through the orifice 80 and will overcome the loading of the spring 90 to cause the valving piston 72 to move to compress the demand side chamber 76. When the valving piston 72 moves sufficiently for the port 84 to come into fluid communication with the annular groove 78, part of the pump output flow will be diverted through the high pressure line 68 and the passage 82 into the demand side chamber 76 and thence into the pilot chamber 48 of the demand control valve 40. The pressure rise below the demand piston 42 plus the load provided by the spring 57 will cause the piston 42 to close the port 52. Fluid trapped in the line 54 under the pressure of the spring 38 will bleed through the orifice 56 without being made up, resulting in the piston 36 moving to increase the output of the pump 10 and increase the pressure in the output line 16 to satisfy the system demand.

As soon as the motor 18 or 20 begins to move, the flow through the control valve 26 or 28 will incur a pressure drop across its internal metering ports causing the pressure in the pilot circuit 61 to drop below that of the pressure in the output line 16. The pressure in the pilot side chamber 74 decreases further due to bleed through the orifice 80 and passageway 82 causing the valving piston 72 to block fluid communication between the output line 16 and the demand valve 40. With a reduction of pressure in the pilot chamber 48, the demand valve piston 42 will uncover the port 52 to add further fluid to the chamber 34 and thus hold the pump output at that required by the fluid motor.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. An improved hydraulic system of the type having a variable displacement pump with an output control means biased to increase pump output and responsive to an input of pressurized fluid to decrease pump output, a fluid motor, a pressurized output line connected between the pump and the motor, a motor control valve interposed in the output line for selectively opening and closing the output line, a control line connected between the pump and the output control means, demand valve means interposed in the control line for selectively opening and closing the control line to allow and block the input of pressurized fluid to the output control mens in response to pressurized fluid in a pilot line connected to the demand valve means, said pilot line [further connected to the output line between] *operatively associated with* the motor control valve and *pressurized by the pressurized fluid to the* motor *when the motor control valve is moved from a neutral position*, wherein the improvement comprises: pressure amplifier means connected to the output line and interposed between the pilot line and the demand valve means and responsive to pressurized fluid in the pilot line to connect the output line to the demand valve means.

2. An improved hydraulic system of the type having a variable displacement pump with an output control mechanism biased to increase pump output and responsive to an input of pressurized fluid to decrease pump output a fluid motor, a pressurized output line connected between the pump and the motor, a motor control valve interposed in the output line for selectively opening and closing the output line, a control line connected between the pump and the output control mechanism, demand valve means interposed in the control line for selectively opening and closing the control line to allow and block the input of pressurized fluid to the output control mechanism in response to pressurized fluid in a pilot line connected to the demand valve means, said pilot line [further connected to the output line between] *operatively associated with* the motor control valve and *pressurized by the pressurized fluid to the* motor *when the motor control valve is moved from a neutral position*, a restricted reservoir line leading from the pilot line to a reservoir, wherein the improvement comprises: pressure amplifier means connected to the output line and interposed between the pilot line and the demand valve means and responsive to pressurized fluid in the pilot line to connect the output line to the demand valve means, said pressure amplifier means including restricted passage means for connecting the pilot line to the reservoir.

3. An improved hydraulic system of the type having a variable displacement pump with an output control mechanism biased to increase pump output and responsive to an input of pressurized fluid to decrease pump output, a fluid motor, a pressurized output line connected between the pump and motor, a motor control valve interposed in the output line for selectively opening and closing the output line, the control line connected between the pump and output control mechanism, demand valve means interposed in the control line for selectively opening and closing the control line to allow and block input of pressurized fluid to the output control mechanism in response to pressurized fluid in a pilot line connected to the demand valve means, said pilot line [further connected to the output line between ] *operatively associated with* the motor control valve and *pressurized by the pressurized fluid to the motor when the motor control valve is moved from a neutral position*, wherein the improvement comprises: pressure amplifier means having a port therein connected to the output line and a chamber provided therein; piston means slidably received in and dividing the chamber into a pilot side chamber connected to the pilot line and a demand side chamber connected to the demand valve means, said piston means having port means therein connected to the demand side chamber and operatively associated with the port, and said piston means slidable to connect the port means to the port in response to pressurized fluid in the pilot side chamber; and biasing means urging the piston means to a position to block the port means from the port.

4. An improved hydraulic system of the type having a variable displacement pump with an output control mechanism biased to increase pump output and responsive to an input of pressurized fluid to decrease pump output, a fluid motor, a pressurized output line connected between the pump and motor, a motor control valve interposed in the output line for selectively opening and closing the output line, a control line connected between the pump and output control mechanism, demand valve means interposed in the control line for selectively opening and closing the control line to allow and block the input of pressurized fluid to the output control mechanism in response to pressurized fluid in a pilot line connected to the demand valve means, said pilot line further connected to the output line between the motor control valve and motor, a restricted reservoir line leading from the pilot line to a reservoir, wherein the improvement comprises: pressure amplifier means interposed between the pilot line and the demand valve means having a port connected to the output line, said pressure amplifier means having a chamber provided therein in fluid communication with the port; piston means slidably received in and dividing the chamber into a pilot side chamber connected to the pilot line and the demand side chamber connected to the demand valve means, said piston means having port means therein, said piston means having fluid passage means therein connecting the port means to the demand side chamber and having restricted passage means provided therein connecting the port means to the pilot side chamber, said piston means operatively associated with the port and slidable to connect the port means to the port in response to pressurized fluid in the pilot side chamber; and biasing means urging the piston means to block the port means from the port.

* * * * *

UNITED STATES PATENT AND TRADEMARK OFFICE

CERTIFICATE OF CORRECTION

PATENT NO. : Re. 29,672

DATED : June 20, 1978

INVENTOR(S) : Harlan Welbert Van Gerpen

It is certified that error appears in the above-identified patent and that said Letters Patent are hereby corrected as shown below:

Column 4, line 20, delete "output" (first occurrence) and insert --- output, ---.

Signed and Sealed this

*Seventeenth* Day of *July 1979*

[SEAL]

*Attest:*

*Attesting Officer*

LUTRELLE F. PARKER

*Acting Commissioner of Patents and Trademarks*